June 15, 1948.
G. M. GEIGER ET AL
2,443,312
PRESSURE CYLINDER
Filed March 6, 1944
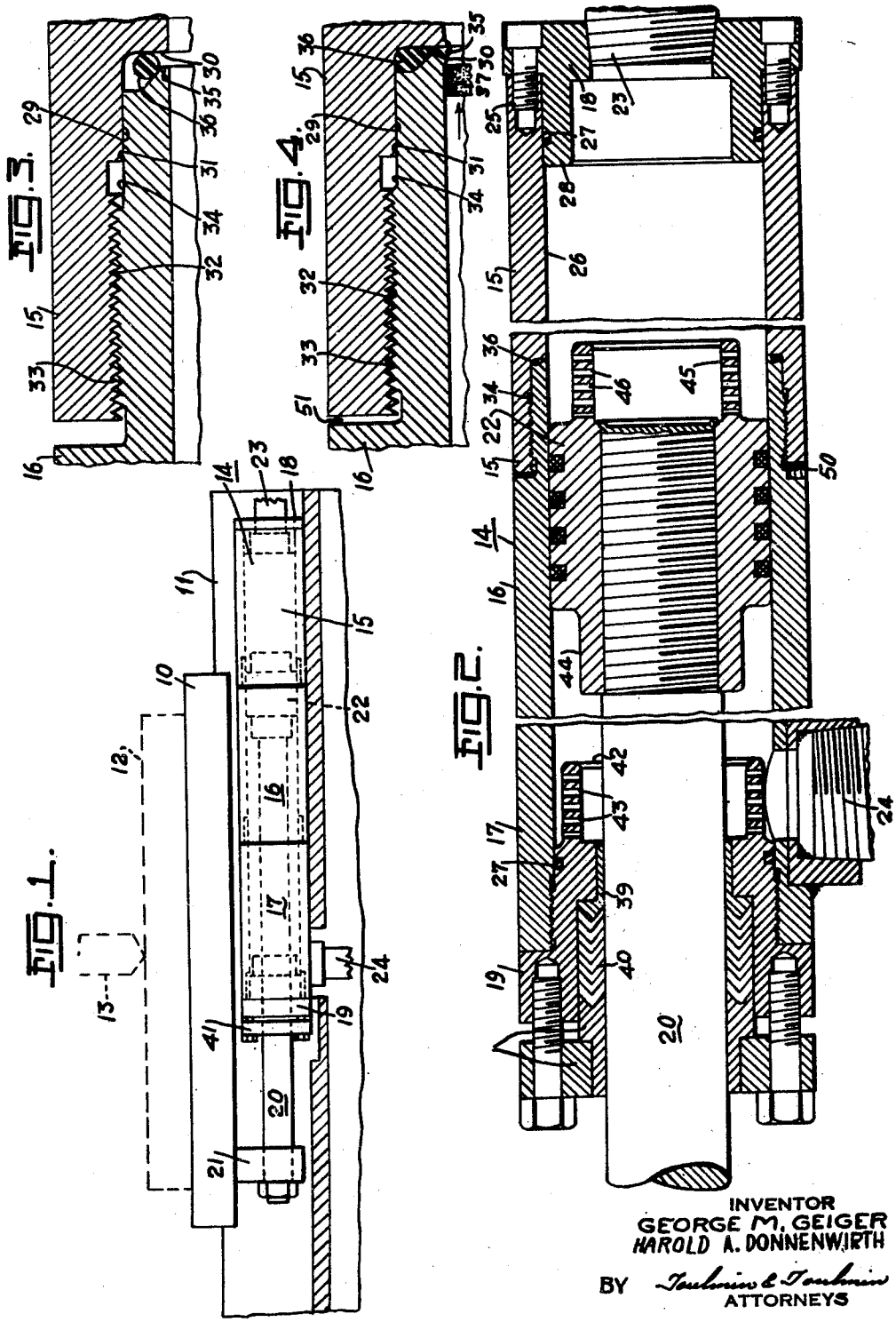
INVENTOR
GEORGE M. GEIGER
HAROLD A. DONNENWIRTH
BY *Toulmin & Toulmin*
ATTORNEYS Patented June 15, 1948

2,443,312

UNITED STATES PATENT OFFICE 2,443,312

PRESSURE CYLINDER

George M. Geiger and Harold A. Donnenwirth, Mount Gilead, Ohio, assignors to H-P-M Development Corporation, Wilmington, Del., a corporation of Delaware Application March 6, 1944, Serial No. 525,258

4 Claims. (Cl. 309—2)

This invention relates to pressure cylinders. More particularly, this invention relates to pressure cylinders of greater than average length.

In many instances such as hydraulically operated machine tools having a long table travel a pressure cylinder of considerable length is required. The casting, handling and machining of these cylinders is sometimes difficult on account of the space requirements necessary. Furthermore, an imperfection in the casting or an inaccuracy in the machining results in the loss of the complete unit.

The primary object of the present invention is to provide long pressure cylinders of short segments or sections whereby the aforementioned difficulties are overcome.

It is another object of this invention to provide an improved sealing means between the various portions of a sectional cylinder.

It is still another object of the present invention to construct such a cylinder wherein the various portions are accurately axially aligned.

These and other objects will become more apparent upon reference to the following description taken in connection with the attached drawings, in which:

Figure 1 is a view of a pressure cylinder constructed according to this invention and mounted in the bed of a machine tool, and Figure 2 is an enlarged longitudinal vertical section through the said cylinder, and Figure 3 is a view showing a joint between adjacent portions of the cylinder before the said portions are completely assembled, and Figure 4 is a view similar to Figure 3 showing the adjacent portions completely assembled.

General arrangement

According to this invention a plurality of relatively short cylinder segments are provided and are assembled end to end to form a long and completed pressure cylinder. Suitable sealing means are provided where each portion joins the next so that leakage therebetween is substantially eliminated. According to this invention the sealing means includes a metal to metal contact and in addition thereto a yielding packing ring formed of a suitable oil resistant material such as some of the synthetic rubbers.

Following the assembly of as many portions as it is desired to assemble, the internal surface of the cylinder is ground or honed so that the completed structure is fluid tight and has an axially accurate bore therethrough.

For use as an element in a hydraulic power system, suitable closure caps are provided for each end of the assembled cylinder and the ram means may be reciprocably mounted therein.

Detailed description

Referring now to Figure 1 there is shown a machine tool such as a grinder or planer having a reciprocating work holding table at 10 which is slidably mounted on a bed 11. Carried by the table 10 is a work piece 12 which it is desired to reciprocate beneath a machining tool 13.

Mounted in the bed 11 is a hydraulic pressure cylinder generally indicated at 14 and comprising a plurality of segments 15, 16 and 17. An end cap or closure plate 18 is provided at the right end of the cylinder and a similar member 19 at the left end. The closure member 19 is apertured to receive the piston rod 20 which is attached by means of a lug or bracket 21 to the table 10. The rod 20 also comprises a piston portion 22 reciprocable within the cylinder 14. Fluid communication is had with the interior of the cylinder through the conduits 23 and 24, the former entering the cylinder through the closure member 18 and the latter entering the cylinder through the segment 17. Pressure fluid is supplied in any well known manner to the conduits 23 and 24 thereby to reciprocate the piston 22 therein and, hence, also to reciprocate the rod 20 and the table 10.

Referring now to Figure 2 the construction of the cylinder 14 is more particularly shown. The segment 15 has bolted to the right end thereof the closure member 18 by any suitable means such as the cap screws 25. The member 18 also includes an inwardly extending annular ring portion 26 which, externally, closely fits within the bore 26 of the segment 15. A groove 27 around the annular portion 26 is adapted to receive a ring of yielding sealing material so as substantially completely to prevent leakage of fluid from the inside of the cylinder to the outside.

The right end cylinder segment 15 terminates in an enlarged bore 29, best seen in Figures 3 and 4. The enlarged bore 29 includes a shoulder 30, a straight bore 31 and a threaded portion 32. The bore 31 preferably has a diameter slightly less than the peak diameter of the threaded portion 32 for a purpose which will become more apparent hereinafter. The above described enlarged bore forms the female portion of the joint between the mating ends of adjoining cylinder sections or segments and provides, by means of the shoulder 30 a metal to metal contact between adjacent cylinder segments and, by means of the straight pilot bore 31, an aligning means for aligning adjacent segments and, by means of the threaded portion 32 the means for retaining the said adjacent segments together.

The right end of the adjacent cylinder section or segment 16, terminates in a male portion adapted to cooperate with the female portion of the segment 15 in order to seal, align and retain the segments in proper association. The right end of the segment 16, which is adapted to cooperate with the bore in the left end of the segment 15, is a reduced diameter portion including a threaded portion 33 adapted to cooperate with the threads 32 on 15, a pilot portion 34 adapted to be received within the straight bore portion 31 of section 15 and, an axially outwardly projecting V-shaped end or tip 35 which is adapted to cooperate with the shoulder 30 in section 15 so as to provide the aforementioned metal to metal contact.

Cylinder segments are assembled as shown in Figure 3 by threading the portion 33 of 16 into the threaded portion 32 of 15. A sealing ring 36 is placed on the shoulder 30 to be retained thereon by the V-shaped tip 35. The cylinder segments are threaded together so as to compress the sealing ring 36, as shown in Figure 4, and also to cause the V-shaped tip 35 to abut the shoulder 30. Preferably, the segments 15 and 16 are threaded together sufficiently tightly so that a slight deformation of the shoulder 30 and the tip 35 is effected at the point of abutment thereof.

The segment 16 terminates at its left end in a female portion substantially identical with that of the left end of section 15. Hence, as many segments as it is desired to assemble may be joined together end to end.

When the segments have been assembled the completed unit is internally ground or honed by a suitable abrasive means such as is indicated at 37 in Figure 4 thereby to provide the unit with a straight, smooth and accurate internal bore.

The left end segment 17 of the cylinder 14 has, at its right end, a male portion substantially identical with that of the segment 16 and, at its left end has a threaded portion adapted to receive the closure member 19. The closure member 19 is provided with an annular groove 27 which contains packing material and provides a seal against leakage of fluid from the interior of the cylinder.

The member 19 is apertured to receive the piston rod 20 and is provided with the usual bushing 38, packing 40 and packing retaining means 41. The member 19 also includes an inwardly extending annular portion 42 which is radially apertured as at 43. Adapted closely to fit within the sleeve 42 is a reduced diameter portion 44 on the piston 22. The arrangement is such that, as the piston 22 approaches the left end of the cylinder 14, the reduced diameter portion 44 will enter the sleeve 42, trapping fluid therein and forcing the same outwardly through the apertures 43 thereby cushioning the final portion of the stroke of the piston 22 and preventing the same from forcibly striking the closure member 19.

The right end of the piston 22 includes a sleeve portion 45 having therein radial apertures 46. The sleeve 45 is adapted to cooperate with the annular portion 28 of the closure member 18 so as to cushion the end part of the rightward movement of the piston 22 in the same manner as described hereinbefore in connection with the portion 44 and with the sleeve 42.

The various segments may be locked together, after assembly, by means of a screw 50 which is threaded into a hole which is drilled and threaded subsequent to the said assembly of the various segments. However, the adjoining parts of the segments may be so formed that they abut externally as well as internally. That is, the space 51 in Figure 4 could be eliminated by properly forming the segments 15 and 16 so as to abut at that point.

It will be understood that various modifications could be made in the structure shown without departing from the spirit of the invention and hence, we do not wish to be limited to the specific structure shown and described but desire to comprehend such modifications as come within the scope of the appended claims and the invention.

Having thus fully described our invention what we claim as new, and desire to secure by Letters Patent, is:

1. A pressure cylinder for a reciprocating hydraulic motor or the like comprising, a first end section, a second end section, and one or more intermediate sections, said sections being axially bored and arranged end to end with said bores in axial alignment, closure members secured to the outer ends of the said end sections, means for securing said sections together in axial alignment comprising telescoping screw threaded portions on the mating ends of adjoining sections, means for providing a substantially continuous internal surface within the assembled cylinder comprising cooperating opposed shoulder portions in the said mating ends of adjoining sections, and means for effecting a seal between adjoining sections comprising cooperating recessed portions within the said mating ends of adjoining sections adapted to receive and compress therein a rubber-like sealing member.

2. In a pressure cylinder for hydraulic apparatus or the like comprising a plurality of axially bored sections arranged end to end, means for joining said sections together comprising a portion formed internally in the end of one of a pair of adjoining sections having a diameter greater than the said axial bore in said section and including a straight portion and a threaded portion, and a portion formed externally of the adjacent end of the other of said adjoining sections and including a straight portion adapted closely to fit within the straight portion of the said internally formed portion and a threaded portion adapted to engage the threaded portion of the said internally formed portion, whereby said straight portions are effective to maintain said sections in alignment while said threaded portions are effective to secure said sections together, said portions abutting when said sections are joined together to provide a continuous metallic surface on the inside of said cylinder and defining a recess for receiving a resilient sealing ring.

3. In a pressure cylinder for hydraulic apparatus or the like comprising a plurality of axially bored sections arranged end to end, means for joining said sections together comprising a portion formed internally in the end of one of a pair of adjoining sections having a diameter greater than the said axial bore in said section and including a straight portion and a threaded portion, and a portion formed externally of the adjacent end of the other of said adjoining sections and including a straight portion adapted closely to fit within the straight portion of the said internally formed portion for axially aligning said sections, and a threaded portion adapted to engage the threaded portion of the said internally formed portion for securing said sections together, a beveled end on the straight portion of said externally formed portion, and a shoulder at the end of the straight portion of said internally formed portion and adapted, when said sections are secured together to define a chamber for receiving a sealing member for sealing against leakage from the interior of the assembled cylinder.

4. As an article of manufacture, a body of metal adapted to be machine worked to form a pressure cylinder comprising, a plurality of axially bored sections arranged end to end, telescoping means associated with the adjacent ends of adjoining sections for aligning said sections, screw threaded means associated with said adjacent ends for detachably securing said sections together, cooperating shoulders on the said adjacent ends for providing an abutment when said screws are secured together, a bevel on one of said shoulders adapted in cooperation with the other of said shoulders to define a recess, a sealing member adapted to be received and compressed within said recess for effecting a circumferential seal between said adjoining sections, and an inwardly extending circumferential ridge formed by the said shoulders at the point of abutment thereof.

GEORGE M. GEIGER.
HAROLD A. DONNENWIRTH.

REFERENCES CITED

The following references are of record in the file of this patent:

UNITED STATES PATENTS

| Number | Name | Date |
|---|---|---|
| 784,636 | Smith | Mar. 14, 1905 |
| 1,396,243 | Beloit | Nov. 8, 1921 |
| 1,955,292 | Heintz | Apr. 17, 1934 |
| 2,107,716 | Singleton | Feb. 8, 1938 |
| 2,112,108 | Mackenzie | Mar. 22, 1938 |
| 2,181,343 | Reimschissel | Nov. 28, 1939 |
| 2,187,217 | Winslow | Jan. 16, 1940 |
| 2,235,070 | Giern | Mar. 18, 1941 |
| 2,365,162 | Abrams | Dec. 19, 1944 |
| 2,372,302 | Swinden | Mar. 27, 1945 |